United States Patent
Kusuda et al.

[11] Patent Number: 6,097,872
[45] Date of Patent: Aug. 1, 2000

[54] OPTICAL TELECOMMUNICATION APPARATUS

[75] Inventors: Kiyonori Kusuda; Junichi Hayama; Kenji Tsutsumi; Hiroshi Kadoya; Kenji Joko; Tetsuya Murayama, all of Kawasaki; Mayumi Nakamura, Inagi; Koichi Nakamura; Kenji Toshimitsu, both of Kawasaki, all of Japan

[73] Assignee: Fujitsu Limited, Kawasaki, Japan

[21] Appl. No.: 09/132,313

[22] Filed: Aug. 11, 1998

[30] Foreign Application Priority Data

Mar. 10, 1998 [JP] Japan ................... 10-058413

[51] Int. Cl.⁷ ............................................ G02B 6/00
[52] U.S. Cl. .................. 385/134; 385/135; 385/89; 174/50
[58] Field of Search .................. 385/134, 135, 385/89–92; 174/50–50.52

[56] References Cited

U.S. PATENT DOCUMENTS 5,421,532  6/1995  Richter ................................ 385/135
5,978,540  11/1999  Bechamps et al. ................. 385/134

FOREIGN PATENT DOCUMENTS

| 62-279699 | 12/1987 | Japan . |
| 2-58004 | 2/1990 | Japan . |
| 8-204358 | 8/1996 | Japan . |
| 9-178998 | 7/1997 | Japan . |

*Primary Examiner*—Cassandra Spyrou
*Assistant Examiner*—Fayez Assaf
*Attorney, Agent, or Firm*—Staas & Halsey LLP

[57] ABSTRACT

An optical telecommunication apparatus includes a shelf, a primary substrate provided in the shelf, a secondary substrate provided on the primary substrate, an optical component provided on the secondary substrate, and an optical connector provided on the secondary substrate for connection with an external optical cable, wherein the secondary substrate is pivoted on the primary substrate about a pivot axis so as to be movable about the pivot axis between a first position in which the secondary substrate is inside said shelf and a second position in which the secondary substrate projects outside of the shelf. The secondary substrate is in electrical connection with the primary substrate while in any position between the first and second positions.

9 Claims, 9 Drawing Sheets

FIG. 4A
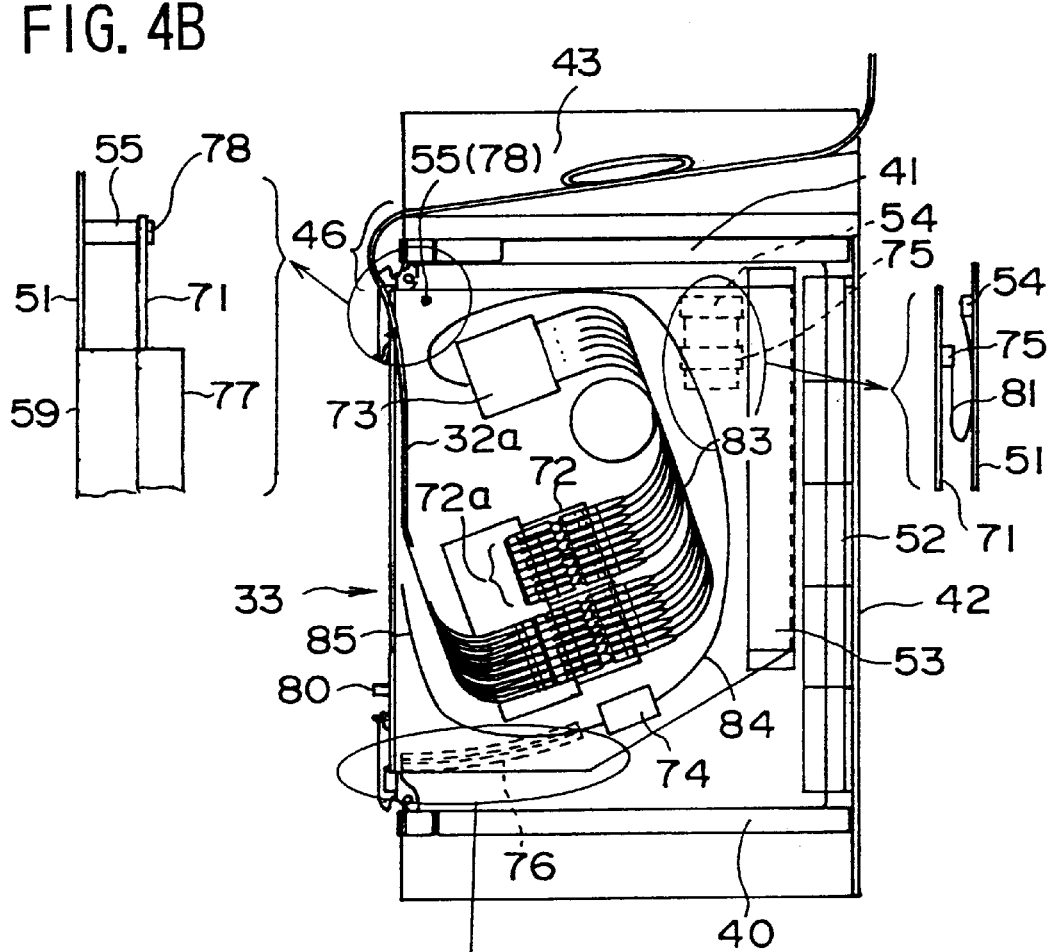
FIG. 4B
FIG. 4C
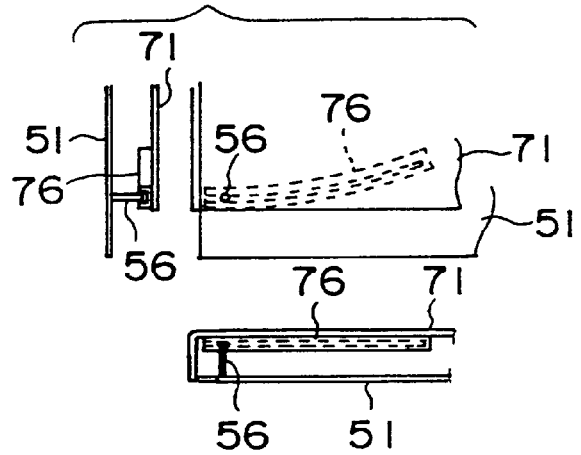

FIG. 5A
FIG. 5C
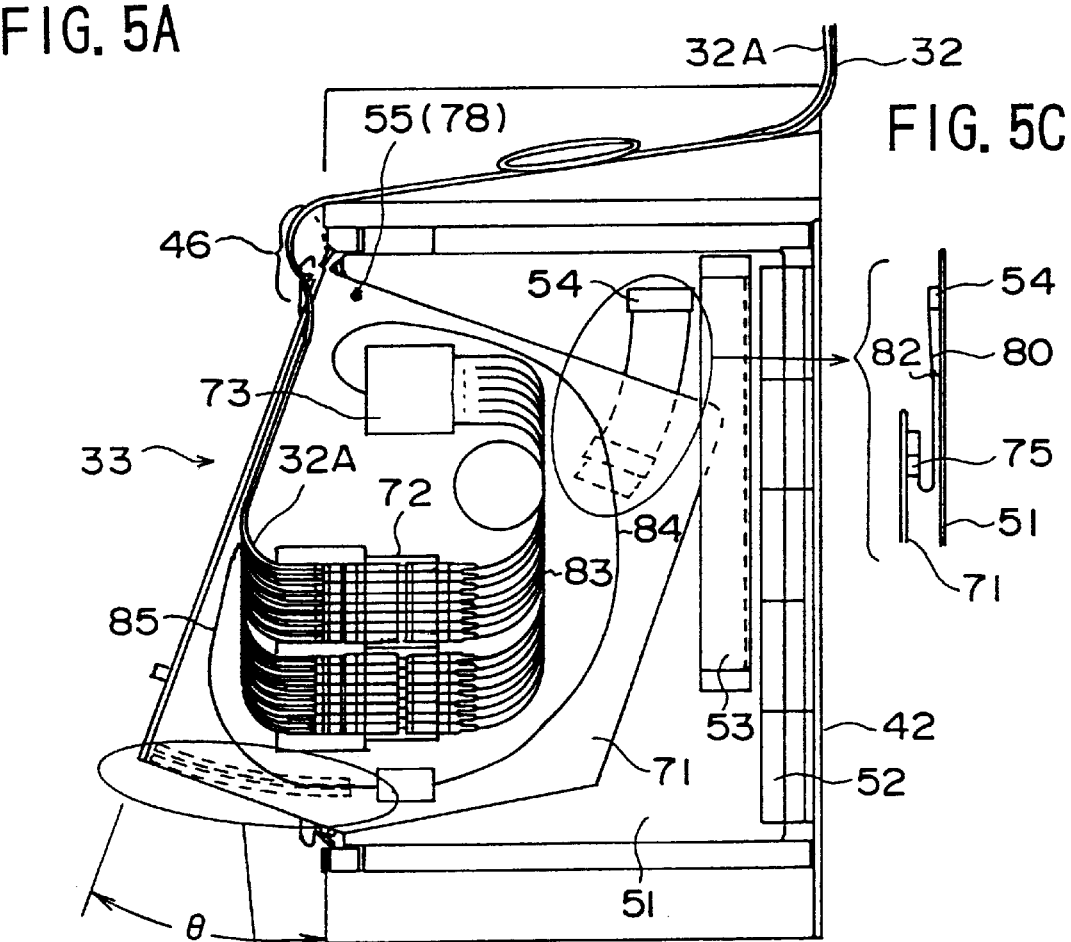
FIG. 5B
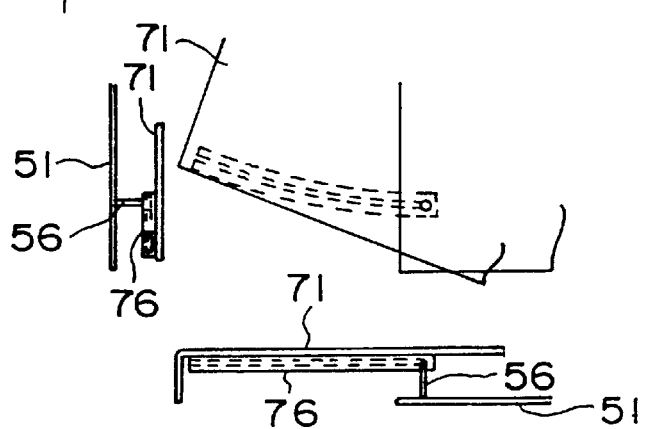

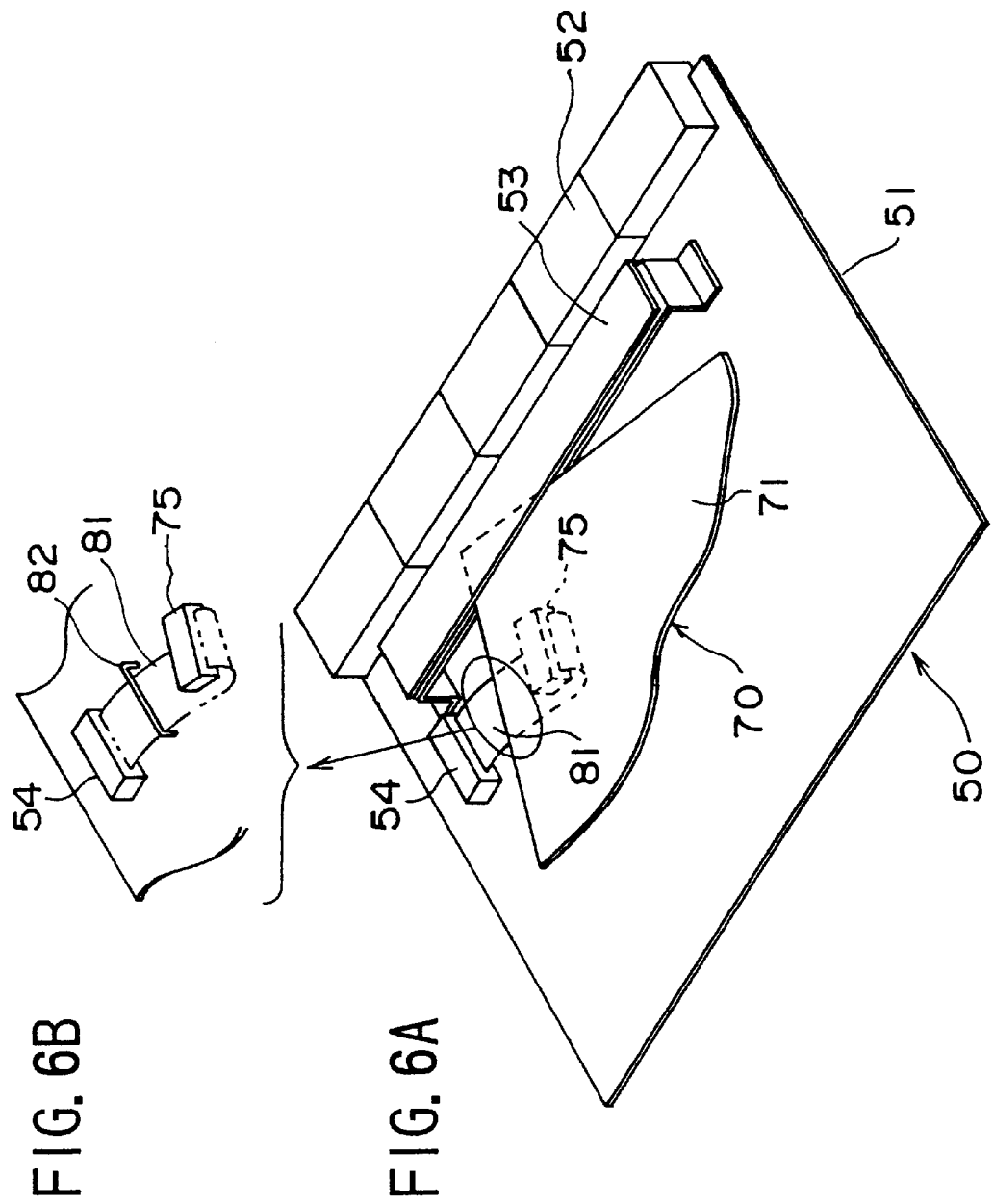

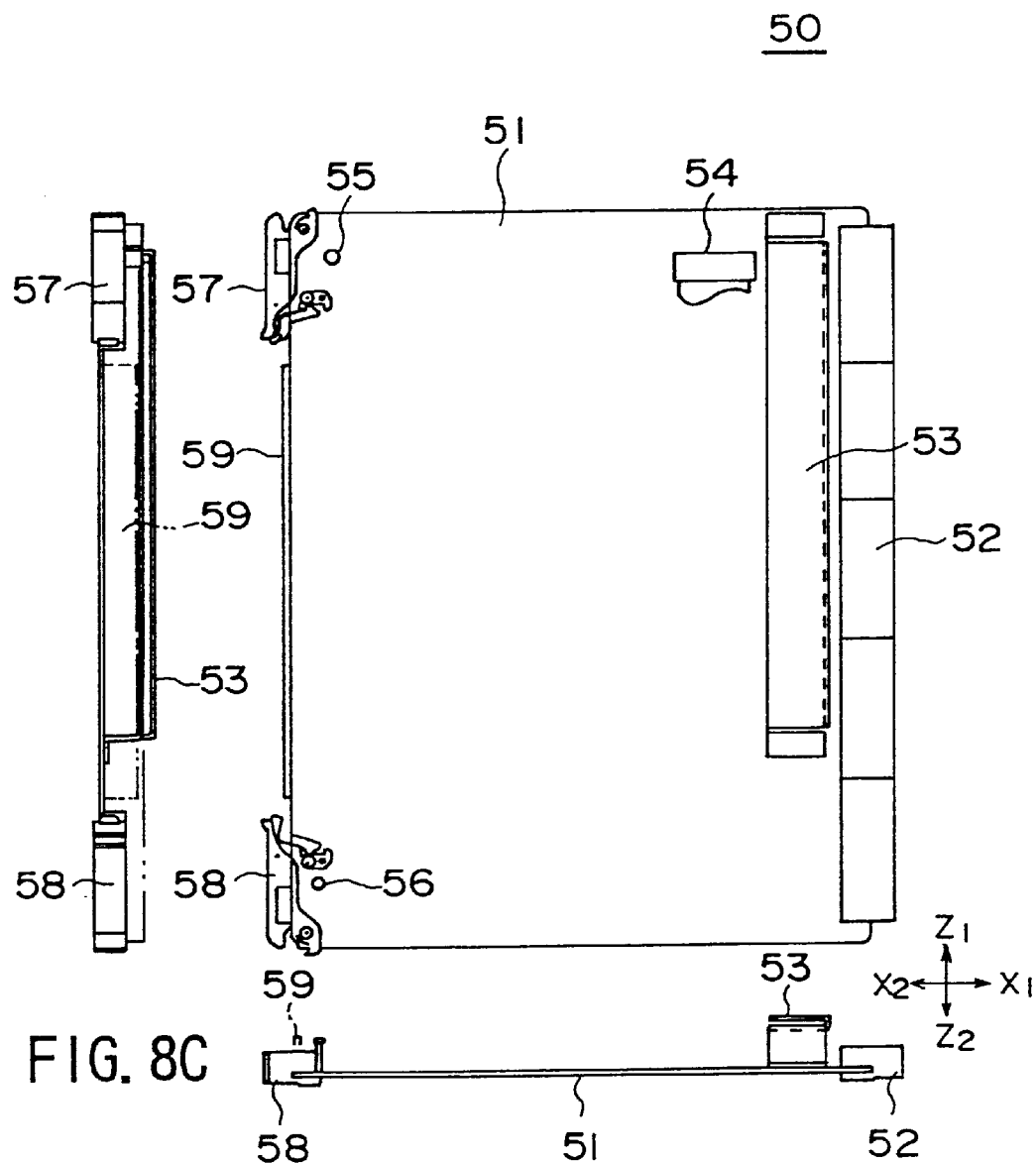

FIG. 9A
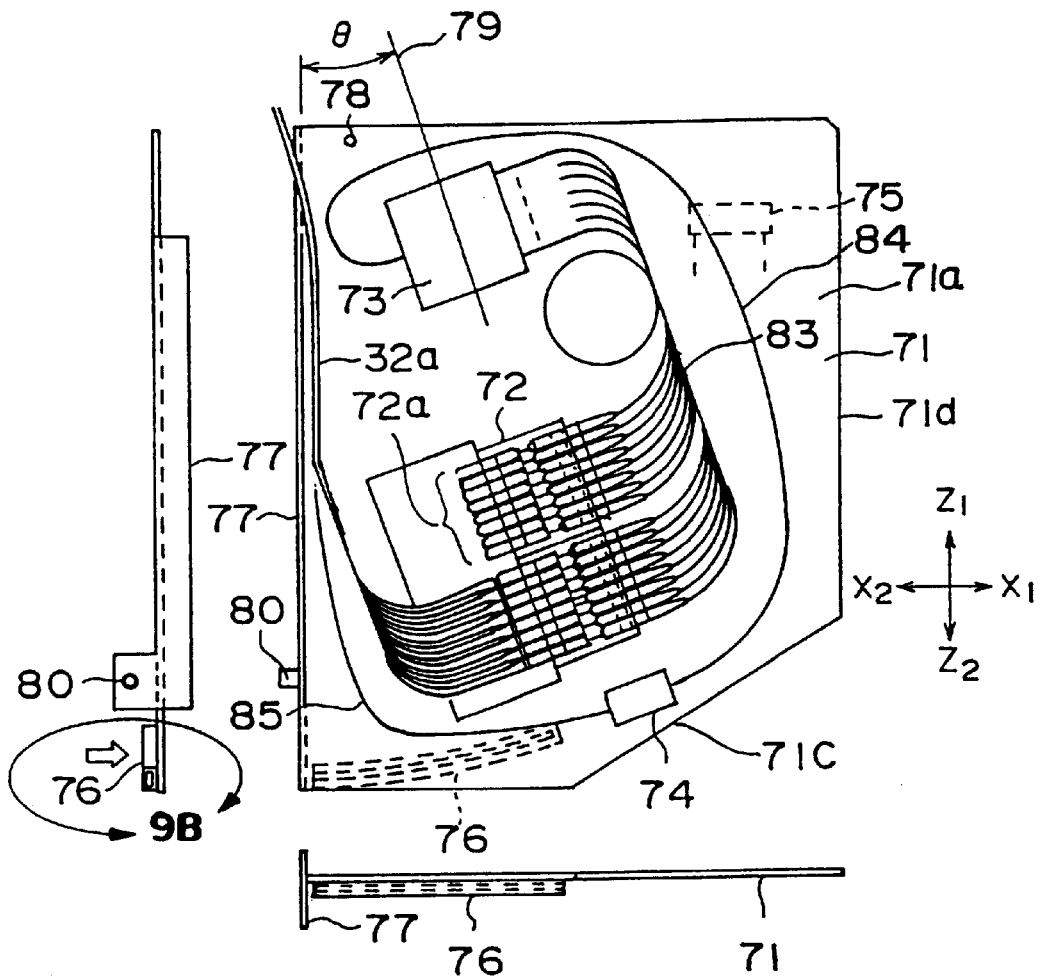
FIG. 9C
FIG. 9B
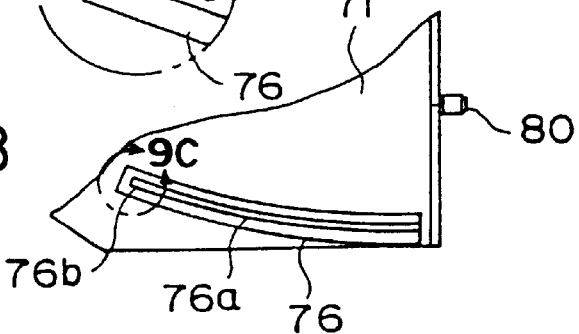

OPTICAL TELECOMMUNICATION APPARATUS

BACKGROUND OF THE INVENTION

The present invention generally relates to telecommunication apparatuses and more particularly to a large-capacity optical telecommunication apparatus carrying out multiplexing and demultiplexing of optical signals.

In the field of telecommunication, the information content or amount of information to be handled by a telecommunication apparatus is increasing sharply in relation to the increasing need of transmitting audio and/or visual data. In correspondence to such an increasing need of transmitting large amount of information, the telecommunication apparatuses used in a telecommunication station for handling a telecommunication traffic is now going to be updated, from a conventional apparatus that converts optical signals once into electrical signals for conducting the signal multiplexing, to a new type apparatus in which the optical signals are multiplexed directly. In order that such a new, full-optical telecommunication apparatus is used extensively in telecommunication stations, it is necessary to design the full-optical telecommunication apparatus for easy maintenance and such that increase or decrease of optical cables, and the like, is achieved easily without exposing the optical cables to the risk of being damaged.

FIGS. 1A and 1B show the process of adding an optical cable in a full-optical telecommunication apparatus that carries out a full-optical signal multiplexing, wherein FIG. 1A shows the state before the addition of the optical cable while FIG. 1B shows the state after the addition of the optical cable.

Referring to FIG. 1A, it can be seen that there is provided an optical signal multiplexing module 10 to which two optical cables, $11_{-1}$ and $11_{-2}$ are connected. The optical signal multiplexing module 10 is connected to a power supply 12 and carries out a multiplexing of the optical signals transmitted through the optical cables $11_{-1}$ and $11_{-2}$. As a result of the multiplexing, the optical signal multiplexing module produces a multiplexed optical signal. The multiplexed optical signal thus produced is supplied to an output optical cable 13.

FIG. 1B shows the case in which another optical cable $11_{-3}$ is added for dealing with the demand of increasing the information content handled by the optical signal multiplexing module 10.

Referring to FIG. 1B, the optical cable $11_{-3}$ is newly connected to the optical signal multiplexing module 10, and the optical signal multiplexing module 10 carries out a multiplexing of the optical signals in the optical cable $11_{-3}$ with the optical signals in the optical cables $11_{-1}$ and $11_{-2}$. The output optical signal thus produced as a result of the multiplexing is supplied to the optical cable $11_{-3}$.

In the process of connecting the optical cable $11_{-3}$ to the optical signal multiplexing module 10, it is important to maintain the connection of the optical signal multiplexing module 10 to the power supply 12. Otherwise, the optical signal multiplexing module 10 is momentarily shut down and the optical transmission via the optical signal multiplexing module 10 is interrupted. In order to avoid such an interruption of the optical transmission, it is desired to construct the optical signal multiplexing module 10 such that the connection of additional optical cables is possible while powering the optical signal multiplexing module 10 by the power supply 12.

FIG. 2 shows the construction of a conventional optical telecommunication apparatus 29 disclosed in the Japanese Laid-Open Patent Publication 8-204358.

Referring to FIG. 2, the optical telecommunication apparatus 20 includes a shelf 22 accommodating therein a plurality of substrate modules 22 in a state that the substrate modules 22 are inserted in the $X_1$-direction and held parallel with each other. Each of the substrate modules 22, in turn, has a construction in which a main substrate 23 supports thereon a sub-substrate 24. The sub-substrate 24 is formed with plurality of elongated holes 24a and is held slidably on the main substrate 23 in the $X_2$-direction by engaging the elongated holes 24a with corresponding pins 23a that are provided on the main substrate 23. It should be noted that main substrate 23 carries electronic components, while the sub-substrate 24 carries an optical connector 25. Further, the main substrate 23 is connected to a back board (not shown) provided inside the shelf 21.

In the optical telecommunication apparatus 20, the optical telecommunication apparatus 20 is connected to an external optical cable 27 in the state that the sub-substrate 24 is pulled out from the shelf 21 in the $X_2$-direction. During such a process of connecting the optical cable 27, the electrical connection between the main substrate 23 and the back board is maintained.

In the optical telecommunication apparatus 20 of FIG. 2, it should be noted that the process of pulling out the sub-substrate 24 from the shelf 21 in the $X_2$-direction tends to cause a damage in the optical cables 27 that are already connected to the sub-substrate 24 as the optical cables 27 are pulled in the $X_2$-direction together with the sub-substrate 24. Further, such a process of pulling the sub-substrate 24 in the $X_2$-direction tends to become difficult due to the resistance of the optical cables 27. This problem becomes particularly serious when there are a number of optical cables 27 already connected to the sub-substrate 24.

In addition, the prior art construction of FIG. 2 has a drawback in that the pins 23a provided on the main substrate 23 reduces the effective area of the main substrate 23 for carrying the electronic components.

SUMMARY OF THE INVENTION

Accordingly, it is a general object of the present invention to provide a novel and useful optical telecommunication apparatus wherein the foregoing problems are eliminated.

Another and more specific object of the present invention is to provide an optical telecommunication apparatus capable of conducting a connection of an optical cable while maintaining the telecommunication apparatus in an operational state.

Another object of the present invention is to provide an optical telecommunication apparatus in which additional connection of an optical fiber is achieved easily.

Another object of the present invention is to provide an optical telecommunication apparatus, comprising:

a shelf;

a backboard provided in said shelf;

a primary substrate provided in said shelf in electrical connection with said backboard;

a secondary substrate provided on said primary substrate in said shelf, said primary substrate and said secondary substrate forming a substrate module;

an optical component provided on said secondary substrate; and an optical connector provided on said secondary substrate, said optical connector being adapted for connection with an optical cable;

said secondary substrate being pivoted on said primary substrate about a pivot axis so as to be movable about said pivot axis between a first position in which said secondary substrate is inside said shelf and a second position in which said secondary substrate is outside said shelf, said secondary substrate being in electrical connection with said primary substrate while in any position between said first position and said second position, including said first and second positions.

According to the present invention, it is possible to connect an optical cable to the optical connector on said secondary substrate while maintaining the operation of the optical component, by pulling out the secondary substrate outside the shelf. As the secondary substrate is pivoted on the primary substrate, the secondary substrate is easily pulled out by merely rotating the secondary substrate about the pivot axis on the primary substrate. Thereby, the resistance of pulling out the secondary substrate is reduced substantially as compared with the case of pulling the entire secondary substrate out from the shelf, even when there are a number of optical cables already connected to the optical connector. Further, because of the reduction in the length of movement of the secondary substrate between the first and second positions, the chance that the optical cables connected to the optical connector are damaged during such a pulling process is reduced substantially.

Other objects and further features of the present invention will become apparent from the following detailed description when read in conjunction with the attached drawings.

BRIEF DESCRIPTION OF THE DRAWINGS

FIGS. 4A–4C are diagrams showing the construction of a substrate module used in the optical telecommunication apparatus of FIG. 3 in a first state;

FIGS. 5A–5C are diagrams showing the construction of the substrate module in a second state;

FIGS. 6A and 6B are diagrams showing the substrate module in an enlarged oblique view;

FIGS. 8A–8C are diagrams showing the construction of a main substrate in detail; and FIGS. 9A–9C are diagrams showing the construction of a sub-substrate in detail.

DETAILED DESCRIPTION OF THE PREFERRED EMBODIMENT

Figure 1A:
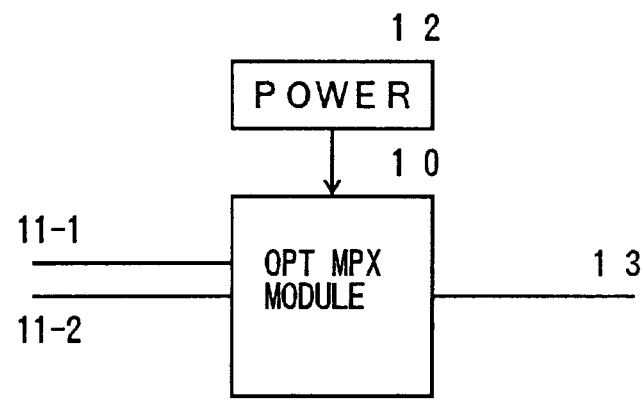
FIGS. 1A and 1B are diagrams showing the construction of a conventional optical telecommunication apparatus.
Figure 1B:
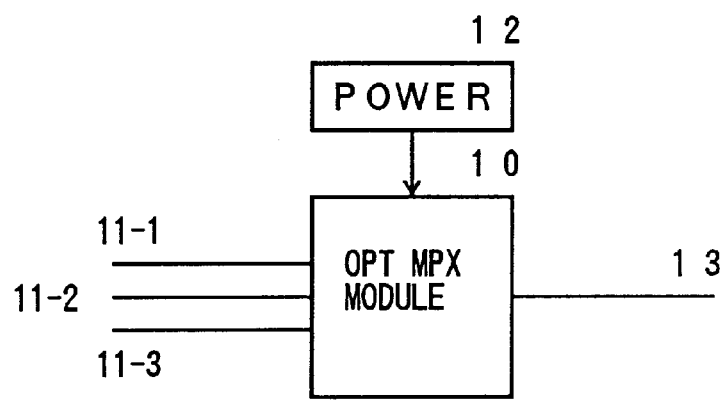
Figure 2:
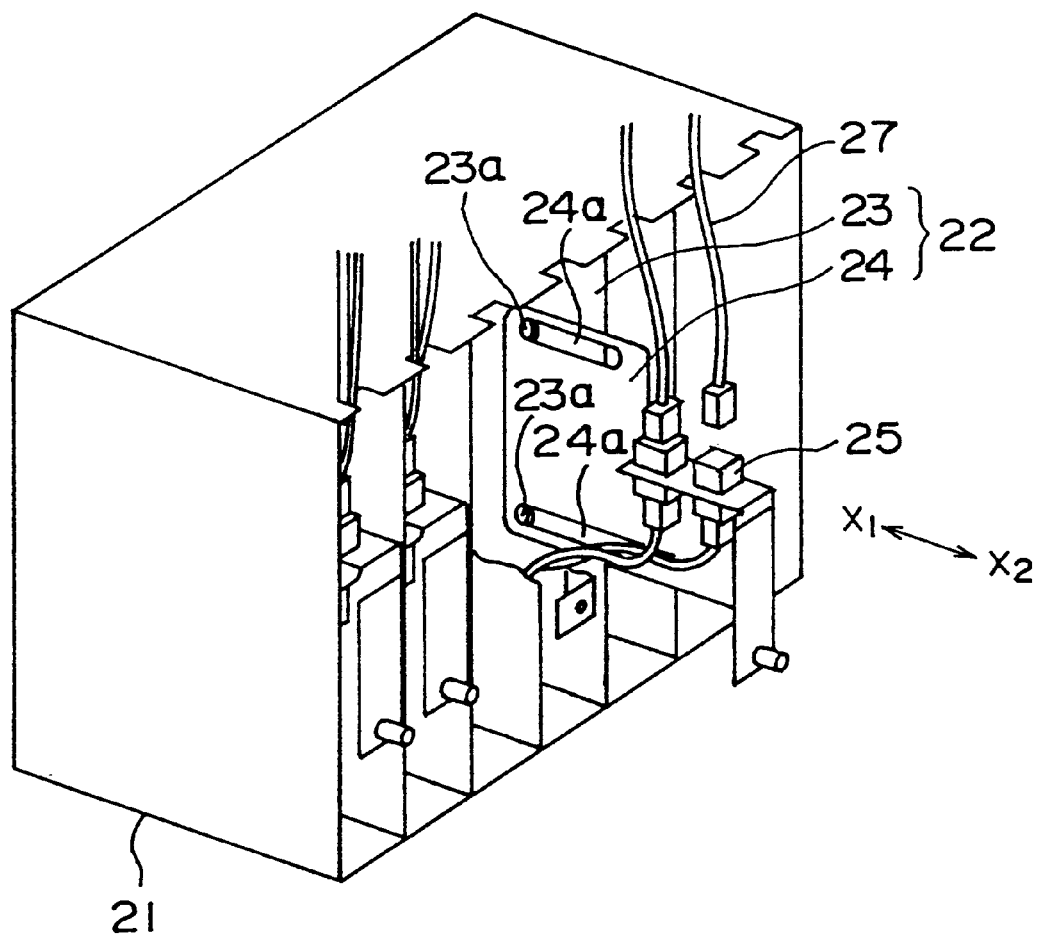
FIG. 2 is a diagram showing the construction of another conventional optical telecommunication apparatus.
Figure 3:
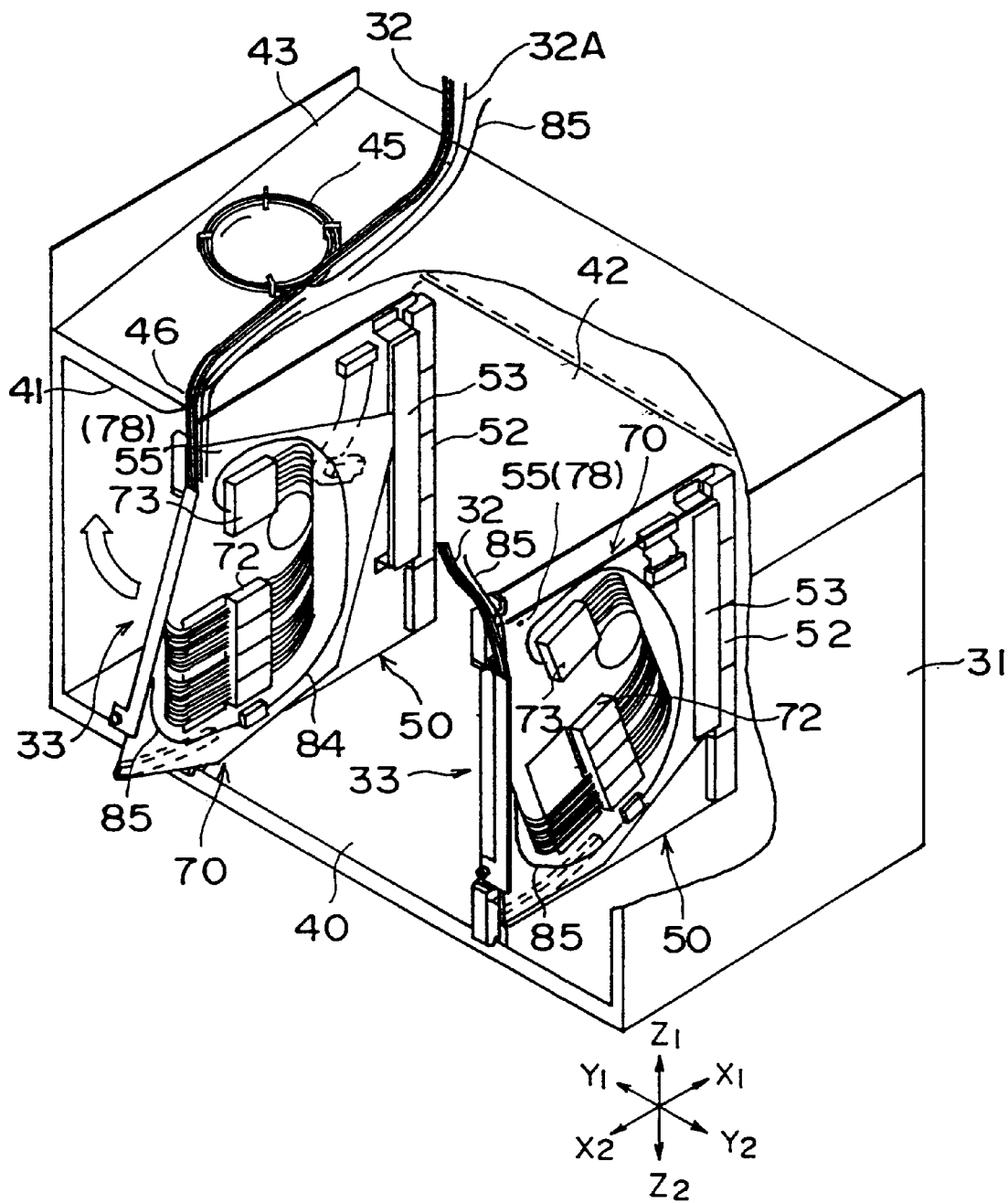
FIG. 3 is a diagram showing the optical telecommunication apparatus according to an embodiment of the present invention in an oblique view.

FIG. 3 shows the construction of an optical telecommunication apparatus 30 for optical telecommunication that uses an optical signal multiplexing technique.

Referring to FIG. 3, the optical telecommunication apparatus 30 includes a shelf 31 in which a number of substrate modules 33 are provided generally parallel with each other. As indicated in FIG. 3, the substrate modules 33 are inserted into the shelf 31 in an $X_1$-direction and are repeated in the $Y_1$-$Y_2$-directions in a generally parallel relationship. Further, the substrate modules 33 are connected with an external optical cables 32.

FIGS. 4A–4C and FIGS. 5A–5C show the inside of the shelf 31 in detail.

Referring to the drawings, the shelf 31 includes a bottom plate 40 carrying a guide rail at the bottom part thereof and a backboard 42 at the rear part. Further, there is provided a duct 43 on the top part of the shelf 31 as a roof of the shelf 31, wherein the duct 43 is used for guiding the optical fiber 32 to the space inside the shelf 31. As indicated in FIG. 3, the duct 43 is tilted toward the front side of the shelf 31.

More specifically, the external optical cable 32 coming down from the upward direction of the shelf 31 reaches the duct 43 at the rear top of the shelf 31 and forms a loop 45 on the duct 43. The loop 45 is fixed upon the duct 43, and the optical cable 32 extends further from the loop 45 toward the front side of the shelf 31 along the duct 43 and enters the space inside the shelf 31 at an inlet part 46 formed at the top part of the shelf 31.

FIGS. 5A–5C, FIGS. 5A–5C, FIGS. 6A and 6B, FIG. 7, FIGS. 8A–8B and FIGS. 9A and 9B show the substrate module 33 in detail.

Referring to the drawings, the substrate module 33 includes a main substrate 50 and a sub-substrate 70, wherein the sub-substrate 70 is pivoted on the main substrate 50 at a corner part of the sub-substrate 70 in which a top edge of the sub-substrate 70 extending in the $X_1$-$X_2$-directions and a front edge of the sub-substrate 70 extending in the $Z_1$-$Z_2$-direction merge with each other. Thereby, sub-substrate 70 is rotatable about the foregoing corner part. It should be noted that the corner part corresponds to the inlet part 46 for introducing the external optical cable 32 into the space inside the shelf 31.

FIGS. 8A–8C show the main substrate 50.

Referring to FIG. 8A, the main substrate 50 includes a generally rectangular substrate body 51 carrying thereon various electronic components (not shown) that form a power supply circuit and various control circuits, wherein the substrate body 51 further carries, at the rear end thereof facing in the $X_1$-direction, a connector 52 for interconnection with the backboard 42 in the shelf 31. Further, the substrate body 5 carries an elongate guide member 53 behind the connector 52 such that the guide member 53 extends in the $Z_1$-$Z_2$-directions, and another connector 54 is provided on the substrate body 5 in the vicinity of the $Z_1$-end of the guide member 53. The guide member 53 may be formed of an elongate bracket member.

Further, the main substrate 50 carries a pin 55 in the vicinity of the optical fiber inlet 46 located at the upper-front corner ($X_2$-$Z_1$ corner) of the substrate 50, and another pin 56 is provided at the lower-front corner ($X_2$-$Z_2$ corner) of the substrate 50. The pin 56 has a laterally extending head part. Further, the substrate body 51 of the main substrate 50 carries, respectively at the upper-front corner and the lower-front corner of the substrate body 51, a lever 57 and a lever 58 as indicated in FIG. 8B. Further, the front edge of the substrate body 51 is covered by a front bezel plate 59.

Figure 7:
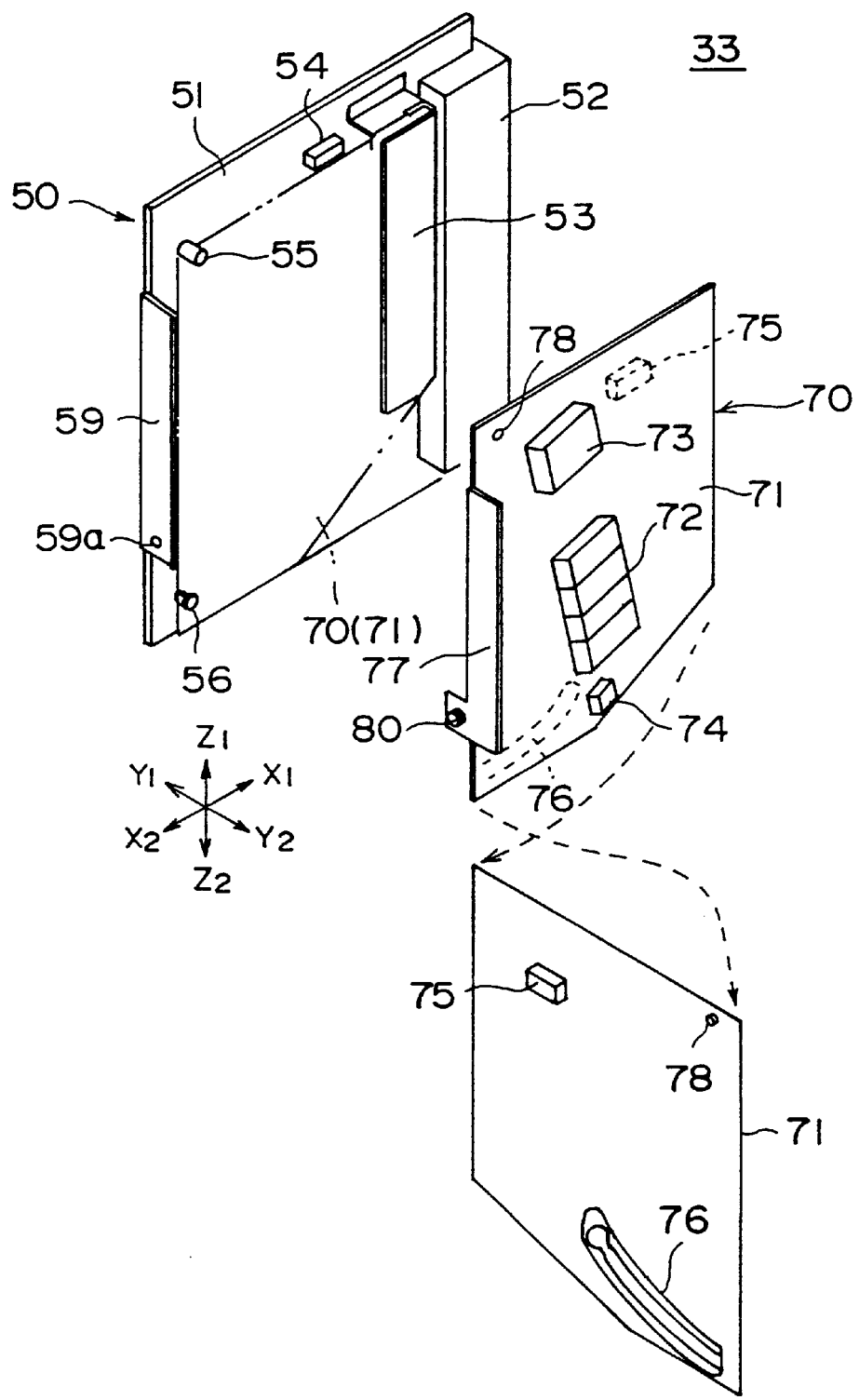
FIG. 7 is a diagram showing the substrate module in an exploded view.

FIG. 7 shows the sub-substrate 70 together with the main substrate 50.

Referring to FIG. 7, it can be seen that the sub-substrate 70 has a generally rectangular shape similarly to the main substrate 50 but the size of the sub-substrate 70 is slightly smaller than the main substrate 50.

More specifically, the sub-substrate 70 includes a generally rectangular substrate body 71 having a first surface 71a, wherein the substrate body 71 carries, on the first surface 71a thereof, a plug-in optical connector 72, an optical signal multiplexing module 73 and another optical connector 74. Further, the substrate body 71 has an opposite, second substrate surface 71b wherein the substrate surface 71b carries thereon a connector 75 and a guide rail 76. In addition, the substrate body 71 carries a shielding plate 77 at the front edge thereof.

It should be noted that the optical connector 72 is used to accept the optical cable 32 including a number of optical cable elements as indicated in FIG. 9A and forwards the optical signals transmitted thereto through the optical cable elements of the optical cable 32 to the optical signal multiplexer module 73 via another optical cable 83. The optical cable 83 includes also a number of optical cable elements. The multiplexed optical signal thus produced by the optical multiplexing module 73 is then forwarded to the optical connector 74 via an optical cable 84, wherein the optical connector 74 accepts an output optical cable 85 and forwards the output multiplexed optical signal in the optical cable 83 to the output optical cable 85.

Further, it should be noted that there is provided a hole 78 in the substrate body 71 at the upper-front corner for engagement with the pin 55 on the main substrate 50. The sub-substrate 70 thus pivoted on the main substrate 50 by the pin 55 and the hole 78 swings between a first position shown in FIG. 5A in which the entire sub-substrate 70 is fully accommodated in the shelf 71 and a second position shown in FIG. 5A in which the sub-substrate 70 is partially pulled out from the shelf 31.

In relation to the movable construction of the sub-substrate 70 about the pivot pin 55 and the corresponding hole 78, it should be noted that the optical connectors 72 and 74 and the optical signal multiplexing module 73 are arranged on the substrate body 71 such that the optical connector 72, the optical signal multiplexing module 73 and the optical connector 74 are aligned in a hypothetical straight line 79 passing through the an area near the hole 78 with an angle θ with respect to the front edge of the substrate body 71. See FIG. 9A. Further, it should be noted that the guide rail 76 is curved and extends generally obliquely-from the front edge of the substrate in the upper-rear direction about the hole 78 along a circular path, as indicated in FIG. 9B. Further, as indicated in FIG. 9A, the corner of the substrate body 71 diagonal to the corner where the hole 78 is provided is slanted to form an oblique edge 71c.

FIG. 9B shows the details of the rail groove 76.

Referring to FIG. 9B, it should be noted that guide rail 76 includes a guide groove 76a to which the pin 56 is engaged. As indicated in the enlarged view of FIG. 9B, there is provided a lock part 76b at the end of the groove 76a for holding the pin 56 therein. The lock part 76b thereby forms a lock mechanism locking the sub-substrate 70 in the pulled-out state of FIG. 5A. Further, it can be seen that there is provided a screw 80 at the bottom part of the shielding plate 77.

Hereinafter, the mechanical as well as electrical relationship between the sub-substrate 70 and the main substrate 50 will be described.

As explained before, the sub-substrate 70 and the main substrate 50 are mechanically engaged in the state that the hole 78 is engaged with the pin 55 and the guide groove 76a of the guide rail 76 is engaged with the pin 56. As the pin 56 has a laterally extending head part, the mechanical engagement of the pin 56 and the guide rail 76 is maintained with reliability. Further, it should be noted that the rear edge 71d of the substrate body 71 is engaged with the guide member 53 on the main substrate 50.

The sub-substrate 70 is thereby held parallel to the main substrate 50 and is rotated about the hole 78 or the pin 55 for an angle θ between the first state of FIG. 4A and the second state of FIG. 5A in a plane parallel to the main substrate 50. Thereby, the pin 56 and the guide groove 76a of the guide rail 76 form a first guide mechanism while the guide member 53 forms a second guide mechanism.

The main substrate 50 and the sub-substrate 70 are connected with each other electrically by a flexible cable 81 shown in FIGS. 6A and 6B, wherein the flexible cable 81 achieves the electrical connection by connecting a first end of the flat cable 81 to the connector 54 and a second end to the connector 75. The cable 81 has a sufficient length such that the rotational movement of the sub-substrate 70 for the foregoing angle θ is not restricted by the cable 81. In order to avoid twisting, the flat cable 82 is loosely attached to the substrate body 51 by using a U-shaped pin 82.

In the normal operational mode of the telecommunication apparatus 30, it should be noted that the sub-substrate 70 is fixed to the main substrate 50 by the screw 80 such that the screw 80 is inserted into a screw hole 59a formed in the front bezel plate 59 of the main substrate 50. It should be noted that the front edge of the sub-substrate 70 and the front edge of the main substrate 50 are substantially coincident in the state that the main substrate 50 and the sub-substrate 70 are connected by the screw 80, and the front bezel 59 of the main substrate 50 is laterally aligned with the shielding plate 77 of the sub-substrate 70.

It should be noted that the substrate module 33 is inserted into the shelf 31 in the state that the bottom edge and the top edge of the main substrate 50 are guided by the respective guide rails of the bottom plate 40 and the top plate 41, wherein the connector 52 of the main substrate 50 is connected to the backboard 42 in the state that the substrate module 33 is fully inserted in the $X_1$-direction. See FIG. 3, FIG. 4A or FIG. 5A.

As indicated in FIG. 9A, the surface 71a of the sub-substrate 70 carries a plurality of optical cable elements forming the optical cable 32 and introduced at the inlet 46 (see FIG. 4A or 5A), wherein the optical cable elements extend behind the shielding plate 77 and connected to the optical plug-in connector 72. In the illustrated example of FIG. 9A, only one-half the input ports of the optical plug-in connector 72 is used and the remaining half are unused as indicated by a reference numeral 72a. Further, the optical plug-in connector 72 and the optical signal multiplexing module 73 are connected by the optical cable 83 that in turn includes a number of optical cable elements similarly to the optical cable 32. The optical cable 83 is coiled between the optical plug-in connector 72 and the optical signal multiplexing module 73 so as to absorb the excessive length thereof.

Further, the single optical cable 84 extends from the optical signal multiplexing module 73 and reaches the optical connector 74, wherein it can be seen that the optical cable 84 is wound in U-shaped form and extends over the surface 71a of the sub-substrate 71 while avoiding the optical cable elements forming the optical cable 83. Further, the optical cable 85 extending from the connector 74 extends to the exterior of the shelf 31 after passing the inlet part 46 in the opposite direction.

The optical signal multiplexing module 73 is powered by the electric power supplied thereto from the backboard 42 via the main substrate body 51 and the flexible cable 81. Thereby, the optical signal multiplexing module 73 carries out an optical multiplexing of the optical signals supplied thereto via the optical cable elements forming the optical cable 32 and the resultant multiplexed optical signal is transmitted via the optical cables 84 and 85.

Hereinafter, the process of increasing the number of the external optical cable 32 in the substrate module 33 will be described.

The process is conducted as follows.

First, the sub-substrate 70 is loosened with respect to the main substrate 50 by loosening the screw 80.

Second, the sub-substrate 70 is pulled in the $X_2$-direction at the bottom part thereof close to the screw 80. As a result, the sub-substrate 70 is rotated about the hole 78 and the pin 55 in the $X_2$-direction with an angle θ. When the sub-substrate 70 is thus fully rotated, the lock part 76b locks the pin 56 and the sub-substrate 70 is held stationary in the state of FIG. 5A in which a part of the sub-substrate 70 is projected outside the shelf 31 from the front surface thereof. In this state, the unused part 72a of the optical plug-in connector becomes accessible by the finer of an operator.

Third, the tip end of a new optical fiber 32A, which is inserted additionally into the space inside the shelf 31 via the optical fiber inlet 46 along with the optical fiber 32, is connected to the unused part 72a of the optical connector 72.

Fourth, the sub-substrate 70 is pushed in the $X_1$-direction firmly at the part near the screw 80 such that the lock part 76b is disengaged from the pin 56. By further pressing the sub-substrate 70 in the $X_1$-direction, the sub-substrate 70 is rotated in the $X_1$-direction and is fully retracted into the shelf 31.

Finally, the sub-substrate 70 is fixed upon the main substrate 50 by tightening the screw 80.

In the foregoing process of adding a new optical cable, it should be noted that it is not necessary to shut down the optical telecommunication apparatus 30. In other words, the optical telecommunication apparatus 30 of the present invention enables an increase of the number of the optical cables without interrupting the transmission.

Hereinafter, the advantageous feature of the present invention will be summarized.

(A) By providing the optical cable inlet 46 in the vicinity of the center of the rotational movement of the sub-substrate 70, the optical cable 32 is substantially free from a tensile force even when the sub-substrate 70 is moved about the pin 55. Thereby, the chance that the optical cable 32 is damaged is reduced substantially in the process of increasing the number of the optical cables 32 connected to the telecommunication apparatus 30. Further, it is possible to cause the desired rotational movement of the sub-substrate 70 easily with a small pulling force even in such a case in which there are already a number of optical cables 32 connected to the optical connector 72 on the sub-substrate 70. Thereby, the process of increasing the optical cables can be achieved efficiently.

(B) Because of the lock part 76b formed in the guide groove 76a of the guide rail 76, it is possible to hold the sub-substrate 70 in the state of FIG. 5A in which the sub-substrate 70 is partially pulled out from the shelf 31. Thereby, the operator can carry out the necessary connection of the optical cables 32 to the unused port 72a of the optical connector 72, without holding the sub-substrate 70 by a hand, and the efficiency of operation for connecting the optical cable 32 is improved substantially.

(C) As the sub-substrate 70 is supported on the main substrate 50 not only by the pivot pin 55 but also by the pin 56 engaging the guide rail 76 and the guide member 53 at respective, different locations, the sub-substrate 70 is held stably in the state of FIG. 5A without a substantial rattling. It should be noted that the guide rail 76 supports the lower-front corner of the substrate body 71 of the sub-substrate 70 while the guide member 53 slidably supports the upper-rear corner of the substrate body 71. Thereby, the delicate process of coupling a new optical cable 32 to the unused port 72a of the optical connector 72 is achieved easily. Further, the sub-substrate 70 is returned to the state of FIG. 4A smoothly without a rattling, by merely pressing the substrate body 71 lightly in the $X_1$-direction.

(D) As the pin 55 and the pin 56 are provided on the main substrate 50 at the corners of the substrate body 51 of the main substrate 50, the reduction of the area of the substrate body 51 used for carrying electronic components as a result of providing the pins 55 and 56 is insubstantial.

(E) As the sub-substrate 70 is fixed upon the main substrate 50 by the screw 80, the problem of accidental spring-out of the sub-substrate 70 from the shelf 31 is positively eliminated.

In addition, the shielding plate 77 effectively protects the eyes of the operator from the laser beam produced by the optical signal multiplexing unit 73 and emitted from the unused port of the optical connector 83 after traveling through the optical cable 83.

Further, the construction of the optical telecommunication apparatus 30 of the present invention is useful and effective not only in the case of increasing the number of the optical cables 32 but also for decreasing the number of the optical cables 32.

Further, the present invention is by no means limited to the embodiments described heretofore, but various variations and modifications may be made without departing from the scope of the invention.

What is claimed is:

1. An optical telecommunication apparatus, comprising:
   a shelf;
   a backboard provided in said shelf;
   a primary substrate provided in said shelf in electrical connection with said backboard;
   a secondary substrate provided on said primary substrate in said shelf, said primary substrate and said secondary substrate forming a substrate module;
   an optical component provided on said secondary substrate; and
   an optical connector provided on said secondary substrate, said optical connector being adapted for connection with an optical cable;
   said secondary substrate being pivoted on said primary substrate about a pivot axis so as to be movable about said pivot axis between a first position in which said secondary substrate is inside said shelf and a second position in which said secondary substrate projects outside of said shelf,
   said secondary substrate being in electrical connection with said primary substrate while in any position between said first position and said second position, including said first and second positions.

2. An optical telecommunication apparatus as claimed in claim 1, further comprising a flexible cable connecting said primary substrate and said secondary substrate.

3. An optical telecommunication apparatus as claimed in claim 1, wherein said primary substrate carries thereon a first guide mechanism and a second guide mechanism at respective first and second locations of said primary substrate different from a location of said pivot axis, said first and second guide mechanism guiding a rotational movement of said secondary substrate about said pivot axis.

4. An optical telecommunication apparatus as claimed in claim 3, wherein said pivot axis is provided on a corner of said primary substrate, said first guide mechanism including a pin provided on said primary substrate at a front edge thereof defining said corner with another edge, said first guide mechanism further including a curved guide groove formed on said secondary substrate in engagement with said pin.

5. An optical telecommunication apparatus as claimed in claim 3, wherein said secondary substrate has a corner corresponding to said corner of said primary substrate such that said corner of said secondary substrate is in engagement with said pivot axis, said corner of said secondary substrate being defined by a front edge and another edge of said secondary substrate, said second guide mechanism being a bracket member provided on said primary substrate so as to accept a rear edge of said secondary substrate opposite to said front edge of said secondary substrate.

6. An optical telecommunication apparatus as claimed in claim 1, further comprising a lock mechanism for locking said secondary substrate in said second position.

7. An optical telecommunication apparatus as claimed in claim 1, further comprising a shielding plate provided on said secondary substrate on said front edge thereof.

8. An optical telecommunication apparatus as claimed in claim 1, further including a fixing mechanism for fixing said primary substrate and said secondary substrate in a state in which said secondary substrate is in said first position.

9. An optical telecommunication apparatus as claimed in claim 4, wherein said shelf includes an optical fiber inlet in the vicinity of said corner of said primary substrate.

* * * * *